United States Patent
Yoo et al.

(10) Patent No.: US 11,368,863 B2
(45) Date of Patent: *Jun. 21, 2022

(54) METHOD AND APPARATUS FOR ALLOCATING PTRS IN NEXT GENERATION COMMUNICATION SYSTEM

(71) Applicant: Samsung Electronics Co., Ltd., Suwon-si (KR)

(72) Inventors: Hyunil Yoo, Suwon-si (KR); Mythri Hunukumbure, Staines (GB); Yinan Qi, Staines (GB); Hyungju Nam, Gwangmyeong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/929,880

(22) Filed: May 27, 2020

(65) Prior Publication Data

US 2020/0288335 A1 Sep. 10, 2020

Related U.S. Application Data

(63) Continuation of application No. 16/009,586, filed on Jun. 15, 2018, now Pat. No. 10,687,234.

(30) Foreign Application Priority Data

Jun. 15, 2017 (KR) .......................... 10-2017-0075961
Aug. 10, 2017 (KR) .......................... 10-2017-0101942

(51) Int. Cl.
*H04W 24/08* (2009.01)
*H04L 5/00* (2006.01)
(Continued)

(52) U.S. Cl.
CPC .......... *H04W 24/08* (2013.01); *H04L 5/0048* (2013.01); *H04L 27/2613* (2013.01);
(Continued)

(58) Field of Classification Search
CPC .............. H04L 5/0048; H04L 27/2601; H04L 27/2613; H04L 27/2657; H04W 4/70; H04W 24/08; H04W 84/042
See application file for complete search history.

(56) References Cited

U.S. PATENT DOCUMENTS 11,201,764 B2 * 12/2021 Zhang .................... H04L 5/001
2009/0125793 A1 5/2009 Kishigami et al.
(Continued)

FOREIGN PATENT DOCUMENTS

CN 101449502 A 6/2009
CN 106105375 A 11/2016
(Continued)

OTHER PUBLICATIONS

Vivo, "Discussion on PTRS design", 3GPP TSG RAN WG1 Meeting #89, May 15-19, 2017, 6 pages, R1-1707248.
(Continued)

*Primary Examiner* — Melanie Jagannathan

(57) ABSTRACT

The present disclosure relates to a communication method and system for converging a $5^{th}$-Generation (5G) communication system for supporting higher data rates beyond a $4^{th}$-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services.

(Continued)

The present disclosure discloses a method and an apparatus for allocating a PTRS in a next-generation communication system.

16 Claims, 20 Drawing Sheets

(51) Int. Cl.
*H04L 27/26* (2006.01)
*H04W 4/70* (2018.01)
*H04W 84/04* (2009.01)

(52) U.S. Cl.
CPC ...... *H04L 27/2657* (2013.01); *H04L 27/2601* (2013.01); *H04W 4/70* (2018.02); *H04W 84/042* (2013.01)

(56) References Cited

U.S. PATENT DOCUMENTS

| | | | |
|---|---|---|---|
| 2014/0255029 A1 | 9/2014 | Varanese et al. | |
| 2015/0358132 A1 | 12/2015 | Wallen et al. | |
| 2018/0167946 A1 | 6/2018 | Si et al. | |
| 2018/0351719 A1* | 12/2018 | Lee | H04L 1/00 |
| 2018/0359069 A1 | 12/2018 | Nam et al. | |
| 2018/0359071 A1 | 12/2018 | Lee et al. | |
| 2018/0367277 A1 | 12/2018 | Zhang et al. | |
| 2019/0081844 A1 | 3/2019 | Lee et al. | |
| 2019/0109747 A1 | 4/2019 | Hessler et al. | |
| 2019/0349101 A1* | 11/2019 | Takeda | H04W 72/042 |
| 2020/0008102 A1* | 1/2020 | Yokomakura | H04L 5/0085 |
| 2020/0029235 A1* | 1/2020 | Yokomakura | H04L 1/0026 |

FOREIGN PATENT DOCUMENTS

| | | |
|---|---|---|
| EP | 0854612 A2 | 7/1998 |
| WO | 2013151395 A1 | 10/2013 |

OTHER PUBLICATIONS

Ericsson, "On DL PTRS design", 3GPP TSG-RAN WG1 #89, May 15-19, 2017, 9 pages, R1-1708707.
ZTE, "Discussion on RS for phase tracking", 3GPP TSG RAN WG1 Meeting #89, May 14-19, 2017, 11 pages, R1-1707132.
National Instruments, "Discussion on explicit and implicit signaling for PT-RS", 3GPP TSG RAN WG1 Meeting #89, May 15-19, 2017, 11 pages, R1-1708272.
International Search Report dated Sep. 21, 2018 in connection with International Patent Application No. PCT/KR2018/006586, 3 pages.
Notification of the First Office Action dated Jan. 4, 2022, in connection with Chinese Application No. 201880040108.X, 17 pages.
Office Action dated Jan. 3, 2022, in connection with Korean Application No. 10-2017-0101942, 8 pages.
Samsung, "PT-RS design," R1-1702959, 3GPP TSG RAN WG1 #88, Athens, Greece, Feb. 13-17, 2017, 6 pages.
ZTE et al., "WF on PTRS position for CP-OFDM," R1-1709502, 3GPP TSG RAN WG1 Meeting #89, Hangzhou, China, May 15-19, 2017, 3 pages.
Decision of Patent dated May 2, 2022, in connection with Korean Application No. 10-2017-0101942, 7 pages.
CATT, "Further discussion on RS for phase tracking," 3GPP TSG RAN WG1 Meeting #88, Athens, Greece, Feb. 13-17, 2017, 5 pages.
CATT, "Further discussion on RS for phase tracking," R1-1707489, 3GPP TSG RAN WG1 Meeting #89, Hangzhou, P.R. China, May 15-19, 2017, 4 pages.
Ericsson, "Summary of PTRS open issues and companies views," R1-1707803, 3GPP TSG-RAN WG1 Meeting #89, Hangzhou, China, May 15-19, 2017, 6 pages.

* cited by examiner

{$L_{RB}$, $L_{subcarrier}$, $L_{sym}$} = funcation (A,B)
- where
- $L_{RB}$ ={$L_{RB,1}$,..., $L_{RB,N}$}, $L_{RB,N}$: N-th RB index
- $L_{subcarrier}$ ={$L_{subcarrier,1}$,..., $L_{subcarrier,M}$}, $L_{subcarrier,M}$: M-th subcarrier index in a RB
- $L_{sym}$ ={$L_{sym,1}$,..., $L_{sym,T}$}, $L_{sym,T}$: T-th OFDM/DFT-s-OFDM symbol index in a slot
- A : Resoure assignment
- B : MCS

400

Case where collision occurs between additional DMRS and PTRS

Case where collision occurs between CSI-RS and PTRS

Embodiment in which PTRS is punctured
if collision occurs between DMRS and PTRS

Embodiment in which PTRS is punctured
if collision occurs between CSI-RS and PTRS

METHOD AND APPARATUS FOR ALLOCATING PTRS IN NEXT GENERATION COMMUNICATION SYSTEM

CROSS-REFERENCE TO RELATED APPLICATIONS

This application is a continuation of application Ser. No. 16/009,586, filed Jun. 15, 2018, which claims priority under 35 U.S.C. § 119 to Korean Patent Application No. 10-2017-0075961 filed on Jun. 15, 2017 and Korean Patent Application No. 10-2017-0101942 filed on Aug. 10, 2017, in the Korean Intellectual Property Office, the disclosures of which is incorporated by reference herein in their entirety.

BACKGROUND

1. Field

The present disclosure relates to a wireless communication system, and more particularly, to a method and an apparatus for allocating a PTRS in a next-generation communication system.

2. Description of Related Art

To meet the demand for wireless data traffic having increased since deployment of 4G communication systems, efforts have been made to develop an improved 5G or pre-5G communication system. Therefore, the 5G or pre-5G communication system is also called a "beyond 4G network" or a "post LTE system." The 5G communication system is considered to be implemented in higher frequency (mmWave) bands, e.g., 60 GHz bands, so as to accomplish higher data rates. To decrease propagation loss of the radio waves and increase the transmission distance, the beam-forming, massive multiple-input multiple-output (MIMO), full dimensional MIMO (FD-MIMO), array antenna, an analog beam forming, large scale antenna techniques are discussed in 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, hybrid FSK and QAM modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The internet, which is a human centered connectivity network where humans generate and consume information, is now evolving to the internet of things (IoT) where distributed entities, such as things, exchange and process information without human intervention. The internet of everything (IoE), which is a combination of the IoT technology and the big data processing technology through connection with a cloud server, has emerged. As technology elements, such as "sensing technology," "wired/wireless communication and network infrastructure," "service interface technology," and "Security technology" have been demanded for IoT implementation, a sensor network, a machine-to-machine (M2M) communication, machine type communication (MTC), and so forth have been recently researched. Such an IoT environment may provide intelligent internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, machine type communication (MTC), and machine-to-machine (M2M) communication may be implemented by beamforming, MIMO, and array antennas. Application of a cloud radio access network (RAN) as the above-described big data processing technology may also be considered to be as an example of convergence between the 5G technology and the IoT technology.

Recently, with the development of communication systems, researches for schemes for using a phase tracking reference signal (PTRS) in a next-generation communication system have been actively made. Accordingly, there is an increasing demand for a PTRS allocation method.

SUMMARY

The present disclosure has been made in order to solve the above problems, and an aspect of the present disclosure is to make communication between adjacent base stations performed smoothly by providing schemes for UE-specifically allocating a PTRS to a scheduled resource block (RB).

In accordance with an aspect of the present disclosure, a method for a terminal includes receiving from a base station a phase tracking reference signal (PTRS) transmitted on a plurality of resource elements (REs); and performing phase tracking using the PTRS, wherein the PTRS is not received on the RE on which another reference signal is received among the plurality of REs.

In accordance with another aspect of the present disclosure, a terminal includes a transceiver configured to transmit/receive signals; and a controller configured to receive from a base station a phase tracking reference signal (PTRS) transmitted on a plurality of resource elements (REs) and to perform phase tracking using the PTRS, wherein the PTRS is not received on the RE on which another reference signal is received among the plurality of REs.

In accordance with still another aspect of the present disclosure, a method for a base station includes transmitting to a terminal a phase tracking reference signal (PTRS) for the terminal to perform phase tracking on a plurality of resource elements (REs), wherein the PTRS is not transmitted on the RE on which another reference signal is transmitted among the plurality of REs.

In accordance with yet still another aspect of the present disclosure, a base station includes a transceiver configured to transmit/receive signals; and a controller configured to transmit to a terminal a phase tracking reference signal (PTRS) for the terminal to perform phase tracking on a plurality of resource elements (REs), wherein the PTRS is not transmitted on the RE on which another reference signal is transmitted among the plurality of REs.

According to the aspects of the present disclosure, by exchanging parameters for PTRS allocation between the serving base station and the adjacent base station in the next-generation communication system, it becomes possible to perform zero power (ZP)-PTRS/data puncturing/rate matching to match various PTRS patterns.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
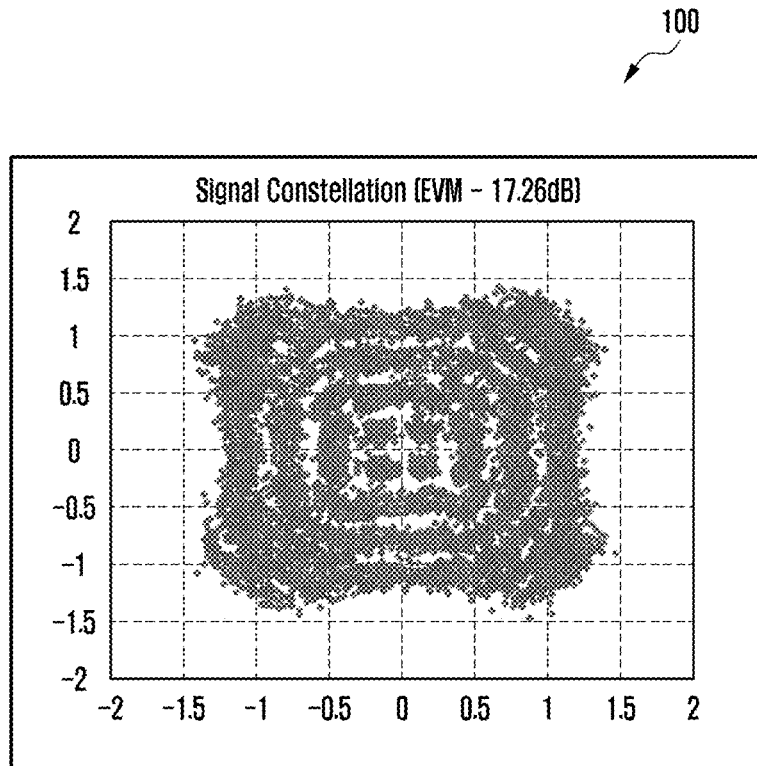
FIG. 1 illustrates an influence of phase noise in case of transmitting a signal at 64 QAM.

FIGS. 1 through 20, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, embodiments of the present disclosure will be described in detail with reference to the accompanying drawings. In describing the present disclosure, related well-known functions or configurations incorporated herein are not described in detail in case where it is determined that they obscure the subject matter of the present disclosure in unnecessary detail. Further, terms to be described later are terms defined in consideration of their functions in the present disclosure, but may differ depending on intentions of a user and an operator or customs. Accordingly, they should be defined based on the contents of the whole description of the present disclosure.

The aspects and features of the present disclosure and methods for achieving the aspects and features will be apparent by referring to the embodiments to be described in detail with reference to the accompanying drawings. How- ever, the present disclosure is not limited to the embodiments disclosed hereinafter, but can be implemented in diverse forms. The matters defined in the description, such as the detailed construction and elements, are nothing but specific details provided to assist those of ordinary skill in the art in a comprehensive understanding of the disclosure, and the present disclosure is only defined within the scope of the appended claims. In the entire description of the present disclosure, the same drawing reference numerals are used for the same elements across various figures.

In an orthogonal frequency-division multiplexing (OFDM)-based wireless communication system, in order to estimate a phase error, a common phase error (CPE) commonly exerting an influence on all OFDM subcarriers is estimated and compensated for using a reference signal in a frequency domain. Further, in a time domain, the phase error is estimated and compensated for in the unit of a symbol using a cyclic prefix to reduce an influence of inter-carrier interference (ICI).

FIG. 1 illustrates an influence of a phase noise (or phase error) in case of transmitting a signal at 64 quadrature amplitude modulation (QAM). As illustrated in FIG. 1, it can be confirmed that due to the influence of the phase noise, the error vector magnitude (EVM) performance becomes greatly deteriorated. Due to the influence of the CPE, phase rotation of respective symbols on constellation and distortion of the constellation can be observed. As described above, the CPE caused by the phase noise may be estimated and compensated for in a receiving end.

In case of single user equipment (UE) multi-input multi-output (MIMO), a phase tracking reference signal (PTRS) for phase noise compensation is orthogonally allocated for estimation performance between PTRS/PTRS and PTRS/data. In the same manner as a demodulation reference signal (DMRS), the PTRS is UE-specifically allocated.

Figure 2B:
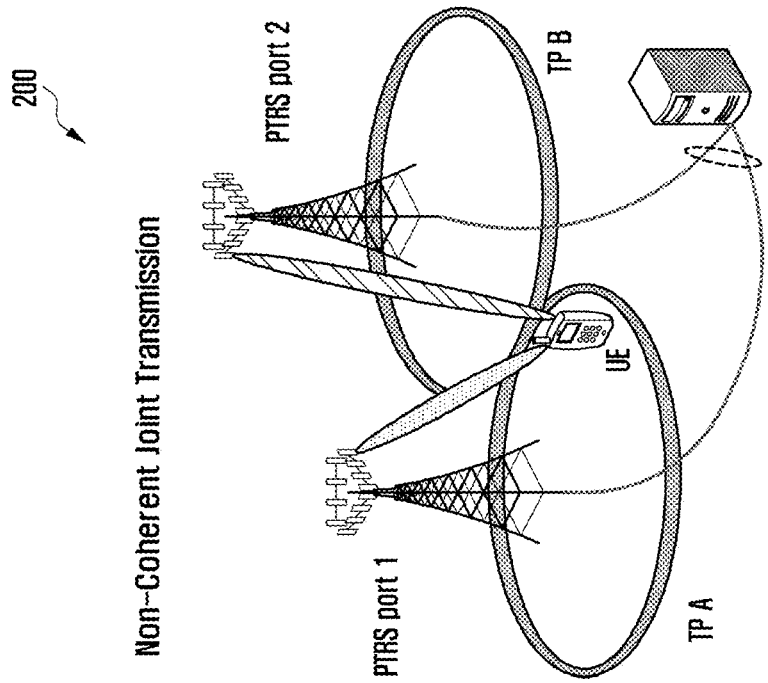
FIGS. 2A and 2B illustrate PTRS operation examples in case where a coordinated multipoint (CoMP) is operated.
Figure 2A:
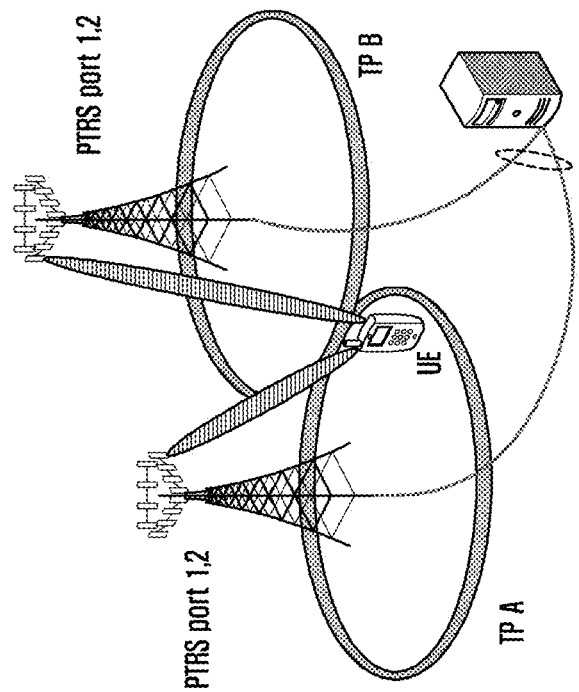

FIGS. 2A and 2B illustrate a method for operating PTRS ports between base stations during a CoMP operation. Referring to FIG. 2A, in case of coherent joint transmission (JT), since two transmission reception points (TRPs) simultaneously transmit the same data/RS to the terminal, the PTRS ports are operated in the same manner. In this case, a terminal may consider and receive signals from two TRPs as signals from one TRP. In contrast, in case of non-coherent JT of FIG. 2B, since two TRPs transmit different data/RSs, the terminal may receive the different data/RSs. In this case, it is necessary to pre-coordinate what PTRS port is to be used between base stations.

Figure 3:
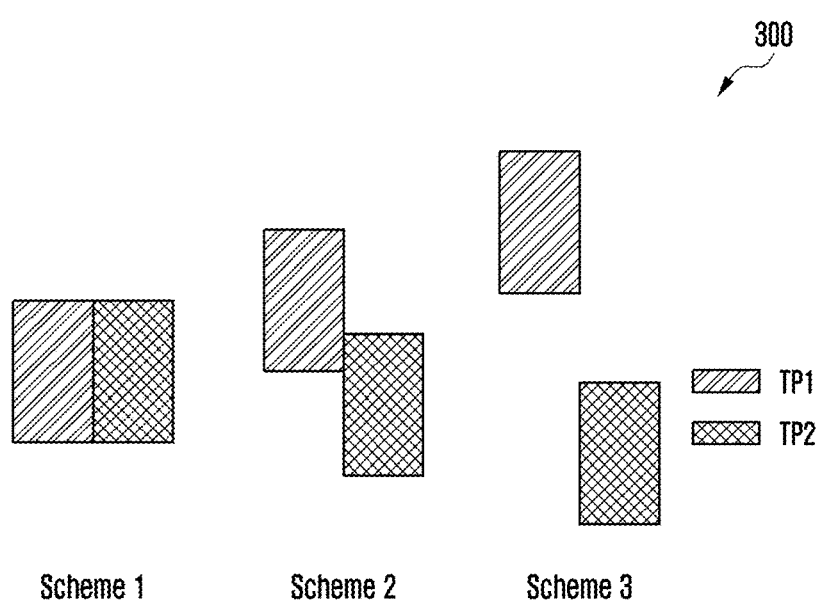
FIG. 3 illustrates a resource allocation example for signals transmitted from two TRPs in case where a CoMP is operated.

FIG. 3 illustrates resource allocation for signals transmitted from two TRPs during the CoMP operation as shown in FIGS. 2A and 2B. Scheme 1 as illustrated in FIG. 3 shows a case where two signals overlap each other in all on frequency-axis, scheme 2 shows a case where two signals partially overlap each other, and scheme 3 shows a case where two signals do not overlap each other. As described above, there are various resource allocations of data transmitted from two TRPs, and in order to maintain orthogonality between PTRS/PTRS and PTRS/data, the TRPs may exchange information for transmitting the data with each other.

As described above, in order to maintain the orthogonality between PTRS/PTRS and PTRS/data, it is necessary to exchange allocation information of the PTRS between the TRPs. The allocation information of the PTRS may be notified as information of L_subcarrier, L_sym, and L_RB. Here, L_subcarrier indicates a subcarrier index to which the PTRS is allocated, L_sym indicates a symbol index to which the PTRS is allocated, and L_RB indicates an RB index to which a PTRS subcarrier is allocated. As compared with a method for notifying all PTRS allocation information, a method for analogizing PTRS allocation information based on resource allocation information may be more efficient in view of signaling overhead.

Figure 4:
FIG. 4 illustrates parameters for determining PTRS allocation according to an embodiment of the present disclosure.

FIG. 4 illustrates a method by a base station for notifying PTRS allocation information as described above according to an embodiment of the present disclosure. Since the PTRS can have different time/frequency resources for respective UEs, the base station may determine time/frequency patterns through resource assignment information. Here, the resource assignment information includes RB indexes to which data channels are allocated in a frequency domain and the number of RBs. In case of a large number of RBs, the frequency density of the PTRS may be high, whereas in case of a small number of RBs, the frequency density of the PTRS may be low. Further, in order for the base station to know what RB index the PTRS having what frequency density is allocated to, it is required for the base station to know what RB index the data channel is allocated to.

As another method for notifying of the PTRS allocation information, the base station may notify of the PTRS allocation information using the RB to which the PTRS is allocated as bitmap information. For example, if there is 10 RBs and the PTRS is allocated to even-numbered RBs, it can be notified whether the PTRS is allocated to the corresponding RB through a combination of 0 and 1, such as 0101010101. Such bitmap information may be transferred to the terminal through radio resource control (RRC)/medium access control element (MAC CE)/downlink control information (DCI) signaling. In the RB to which the PTRS is allocated, the subcarrier index may be replaced by the PTRS frequency pattern indicated by the number of scheduled RBs.

As another method for notifying of the PTRS allocation information, the base station may predefine the pattern of the RB to which the PTRS is allocated, and may notify the terminal of what pattern is used.

Figure 5:
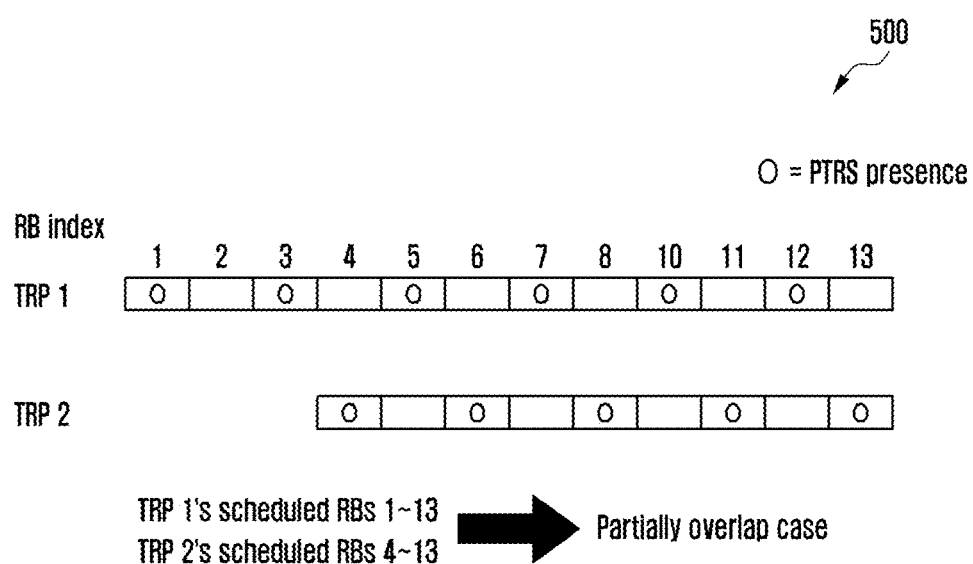
FIG. 5 illustrates a process of allocating a TPRS to a scheduled RB according to an embodiment of the present disclosure.

FIG. 5 illustrates PTRS allocation in accordance with resource assignment information according to an embodiment of the present disclosure. In the drawing, TRP1 transmits data to the terminal using RB indexes 1 to 13, and TRP2 transmits data to the terminal using RB indexes 4 to 13. In an embodiment, different PTRS densities may be provided in accordance with the RB size, and the PTRS may be differently allocated in accordance with the allocated RB. However, if TRP1 and TRP2 share PTRS allocation information, TRP2 may operate zero power (ZP)-PTRS in the subcarrier index on which the PTRS of TRP1 is transmitted. In contrast, TRP1 may operate the ZP-PTRS in the subcarrier index on which TRP2 transmits the PTRS to maintain orthogonality between PTRS/PTRS and PTRS/data. Here, the base station may transmit the allocated ZP-PTRS information to the terminal through downlink control information (DCI), MAC control element (MAC CE), or RRC. That is, the terminal may receive different ZP-PTRSs and different PTS allocation information from TRP1 and TRP2.

Figure 6:
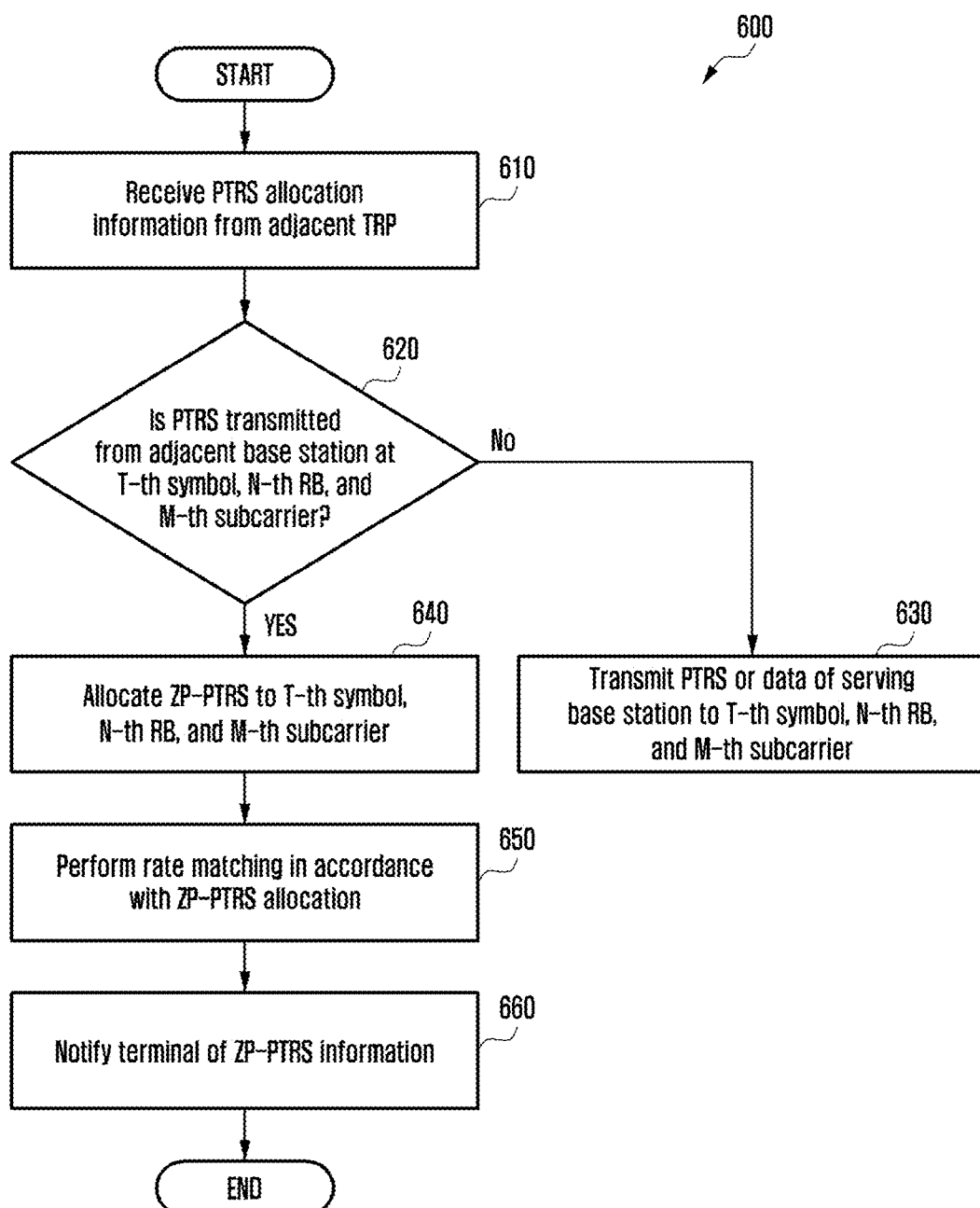
FIG. 6 illustrates a process of receiving PTRS information from an adjacent base station, allocating a ZP-PTRS to a corresponding resource, and notifying a terminal of this according to an embodiment of the present disclosure.
Figure 7:
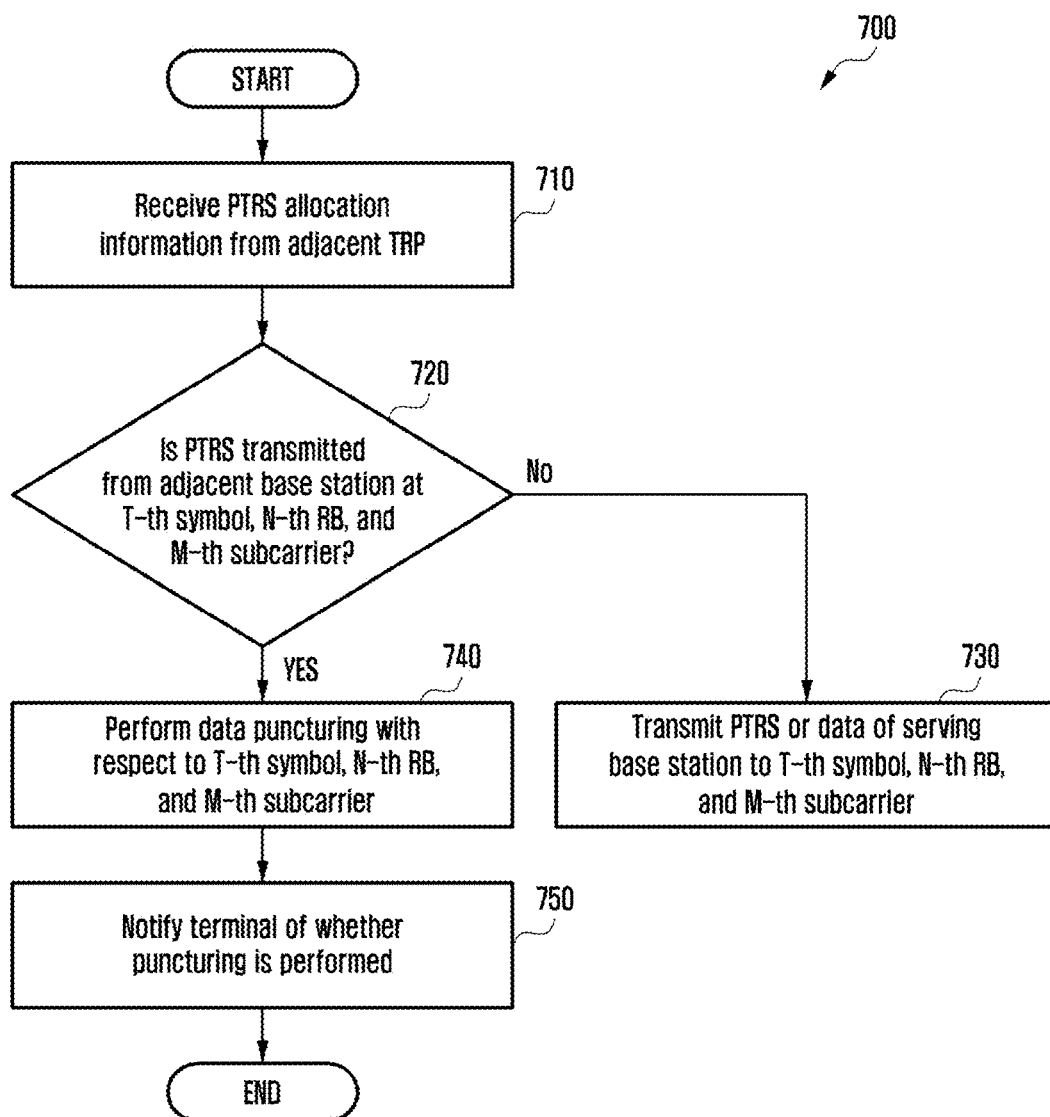
FIG. 7 illustrates a process of receiving PTRS information from an adjacent base station, performing data puncturing with respect to a corresponding resource, and notifying a terminal of this according to an embodiment of the present disclosure.

FIGS. 6 and 7 illustrate a process in which a base station receives PTRS information from an adjacent base station and allocates PTRS/data/ZP-PTRS according to an embodiment of the present disclosure. As illustrated in FIG. 6, the base station may allocate the ZP-PTRS to a subcarrier index on which the adjacent base station transmits the PTRS, and may perform rate matching. Specifically, the base station may receive PTRS allocation information from the adjacent base station (or TRP) (610), and may identify whether the adjacent base station transmits the PTRS at a specific subcarrier (e.g., T-th symbol, N-th RB, and M-th subcarrier)

(620). If the adjacent base station does not transmit the PTRS at the corresponding subcarrier, the base station may transmit the PTRS or data to the terminal at the corresponding subcarrier (630). In contrast, if the adjacent base station transmits the PTRS at the corresponding subcarrier, the base station may allocate the ZP-PTRS to the corresponding subcarrier (640), and perform rate matching in consideration of the ZP-PTRS allocation (650). Then, the base station may notify the terminal of ZP-PTRS-related information (660). However, in the above-described embodiment, since the time/frequency PTRS density has too many options, a large number of corresponding rate matchings may be considered.

Accordingly, in an embodiment illustrated in FIG. 7, the base station may perform puncturing for a resource region to be allocated with the ZP-PTRS, and may notify the terminal of this. The terminal may know what subcarrier has been punctured due to the PTRS through ZP-PTRS configuration. Specifically, the base station may identify whether the adjacent base station transmits the PTRS at a specific subcarrier (720) in accordance with PTRS allocation information 710 received from the adjacent base station, and if the transmission is performed, the base station may perform data puncturing at the corresponding subcarrier (740). Then, the base station may notify the terminal of whether the puncturing is performed (750).

Figure 8:
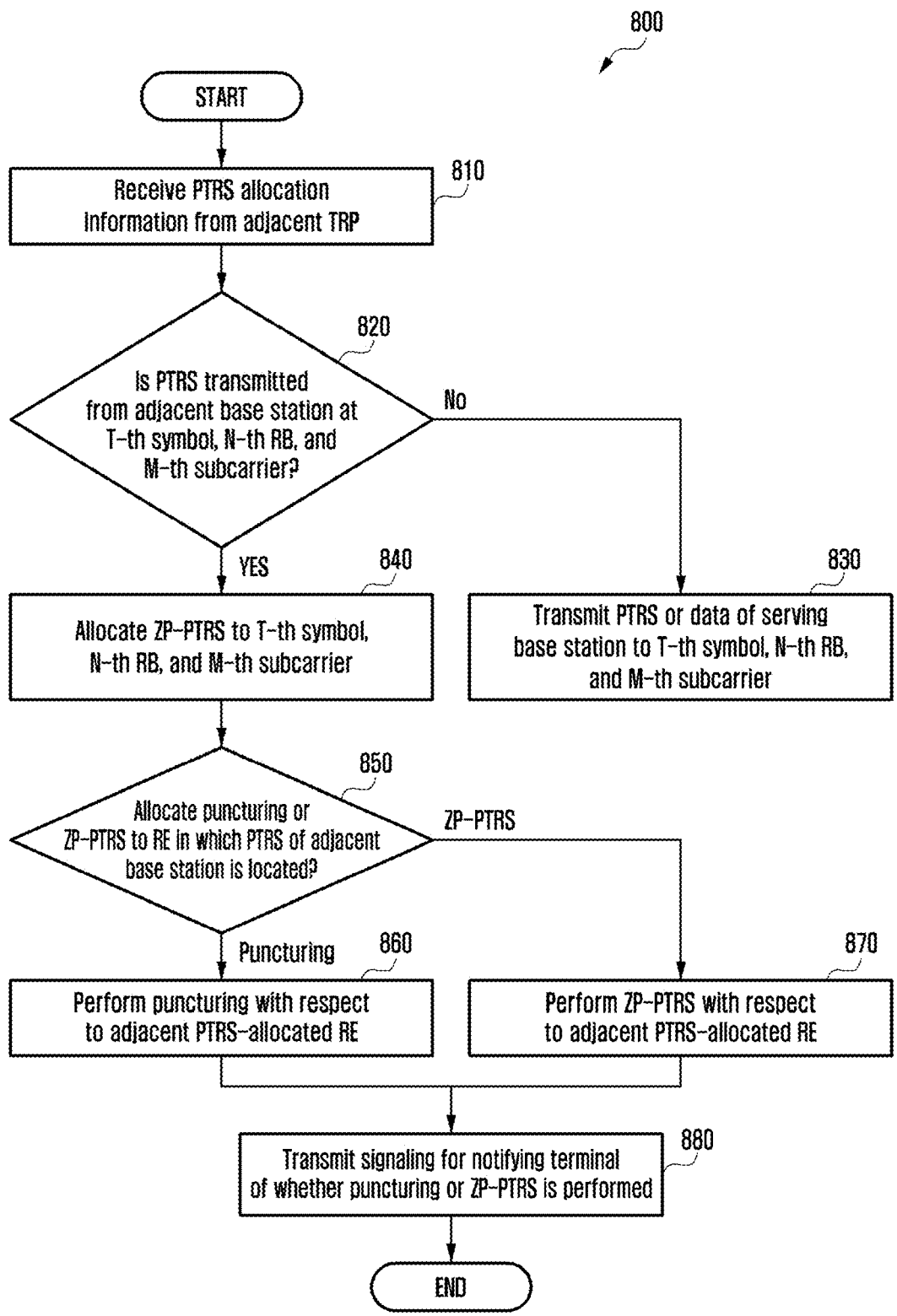
FIG. 8 illustrates a process of receiving PTRS information from an adjacent base station, performing ZP-PTRS or data puncturing, and notifying a terminal of this according to an embodiment of the present disclosure.

Further, as a mixed method of FIGS. 6 and 7, the base station may allocate the ZP-PTRS or perform data puncturing to satisfy the orthogonal multiplexing between PTRS/PTRS or PTRS/data at the RE location to which the adjacent base station has allocated the PTRS. The base station may notify the terminal of signaling to perform such ZP-PTRS or puncturing through DCI/MAC CE or RRC signaling. FIG. 8 is a diagram illustrating a process in which a base station performs ZP-PTRS or data puncturing in accordance with PTRS allocation information of an adjacent base station and notifies the terminal of such information. Specifically, operations 810 to 840 of FIG. 8 are similar to operations 610 to 640 of FIG. 6. Then, the base station may determine whether to perform puncturing or to allocate the ZP-PTRS at the RE in which the PTRS of the adjacent base station is located (850), perform puncturing at the corresponding RE (860) or perform ZP-PTRS allocation (870) in accordance with the determination, and transmit signaling for notifying the terminal of whether the puncturing or the ZP-PTRS allocation is performed (880).

Figure 9A:
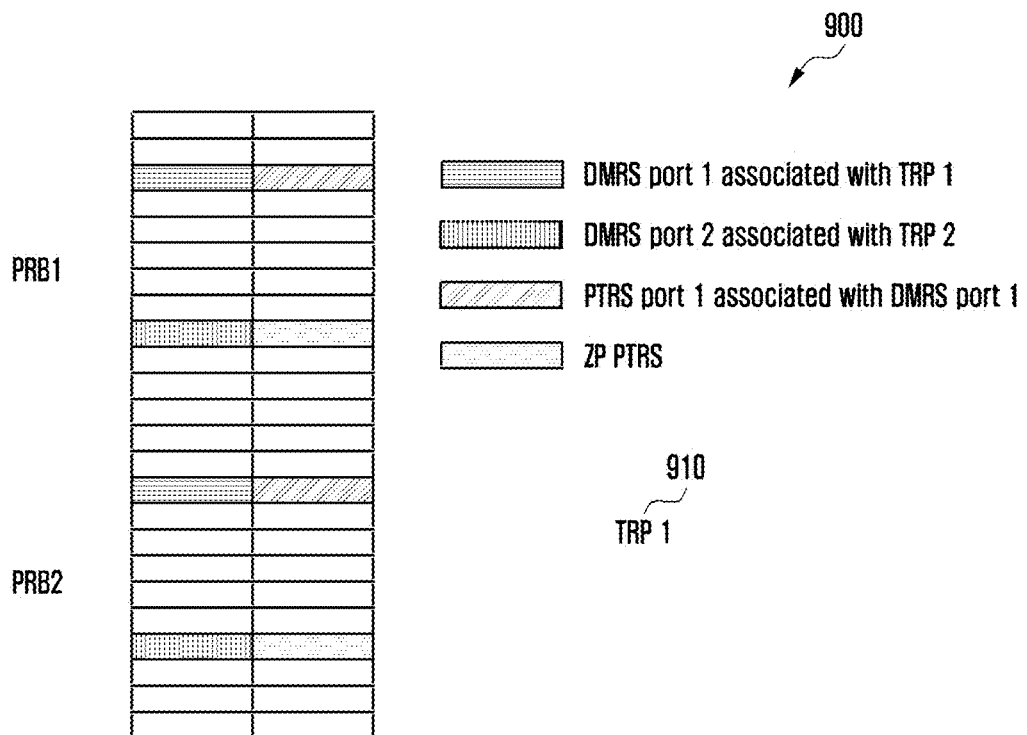
FIGS. 9A and 9B illustrate ZP-PTRS allocation as a fallback solution according to an embodiment of the present disclosure.
Figure 9B:
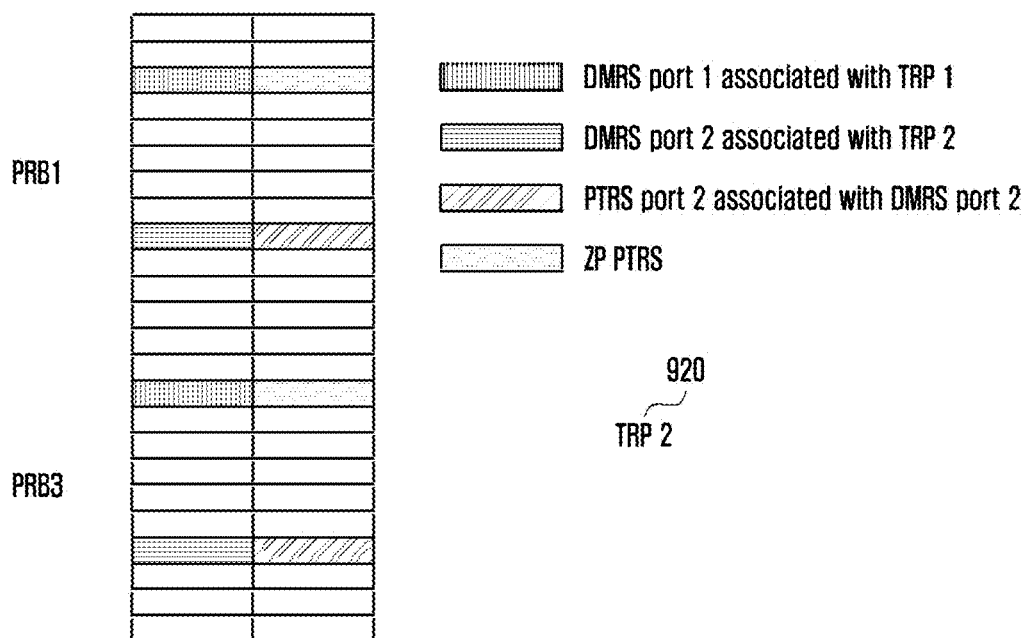

Next, as a fallback solution, a ZP-PTRS allocation method in case where PTRS information cannot be exchanged between two base stations, such as a non-ideal backhaul situation, will be described. FIGS. 9A and 9B are diagrams illustrating ZP-PTRS allocation as a fallback solution. In FIG. 9A, TRP1 910 allocates RB1 and RB2, and in FIG. 9B, TRP2 920 allocates RB1 and RB3. Here, since the two TRPs could not exchange information capable of indicating the PTRS pattern, orthogonality between PTRS/PTRS or PTRS/data may not be maintained. Accordingly, the two TRPs may allocate different DMRSs and may allocated different PTRS ports through corresponding quasi-co-location (QCL) information. Here, since the base station cannot know what RB the adjacent base station uses, it may allocate the ZP-PTRS to all subcarriers to which the PTRS can be allocated.

Figure 10:
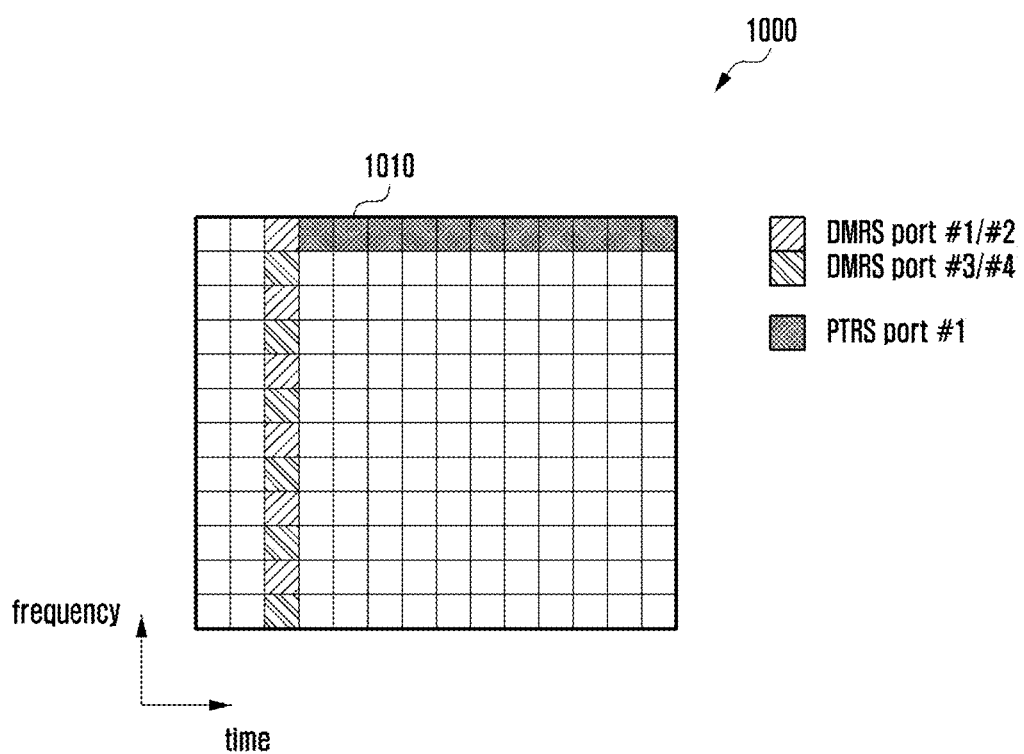
FIG. 10 illustrates successive allocation of PTRS on time axis.

Next, a case where collision between PTRS and another RS occurs during allocation of the PTRS will be described. The PTRS may be allocated successively on time-axis as shown in FIG. 10 (1010). In this case, the PTRS may be allocated to any one of subcarriers to which the DMRS is allocated in the RB.

Figure 11:
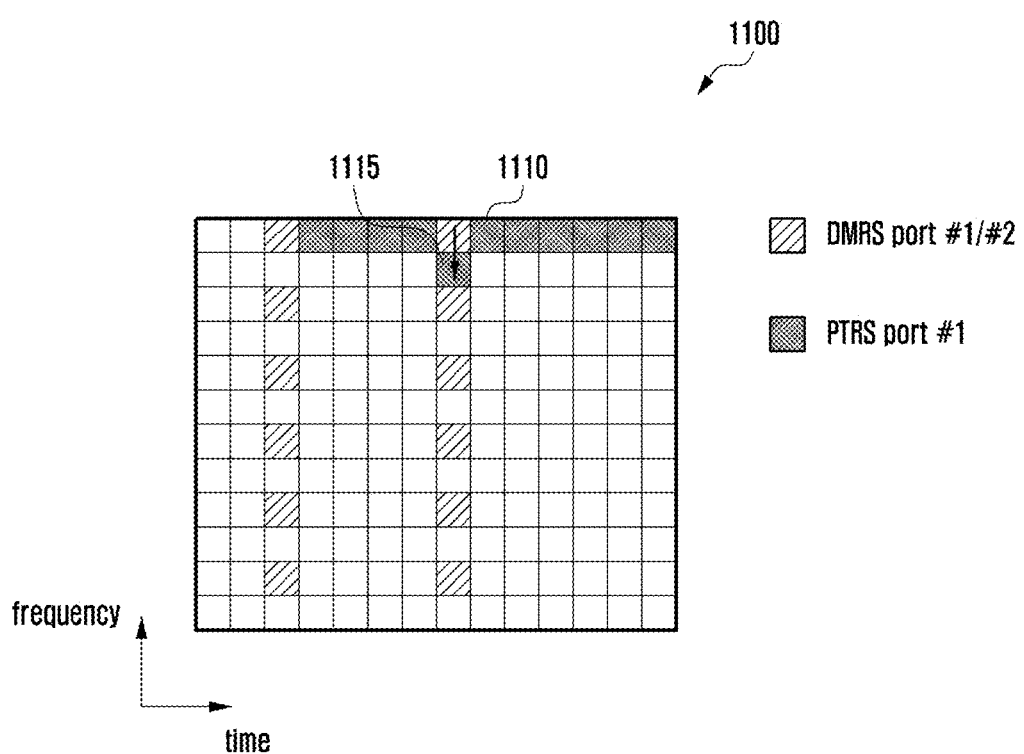
FIGS. 11 and 12 illustrate occurrence of collision between PTRS and another RS.
Figure 12:
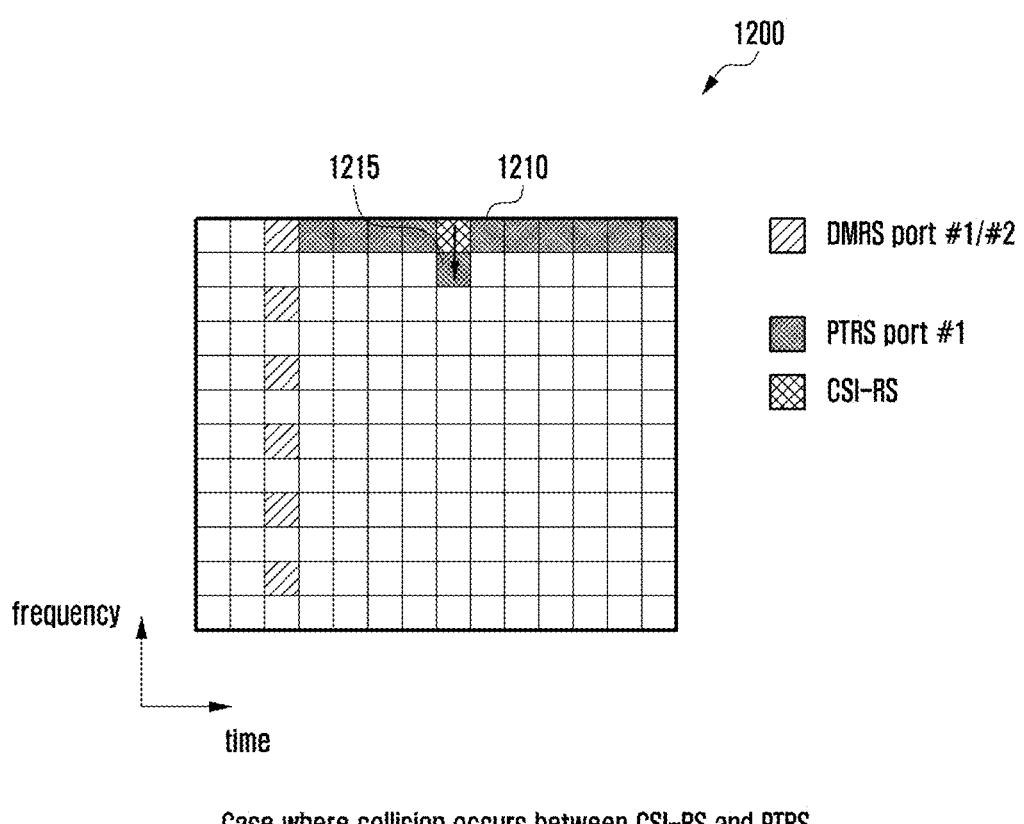

FIGS. 11 and 12 illustrate a case where collision between PTRS and another RS may occur when the PTRS is allocated as shown in FIG. 10. FIG. 11 illustrates a case where collision between DMRS and PTRS occurs when an additional DMRS is allocated (1110), and FIG. 12 illustrates a case where collision between CSI-RS and PTRS occurs when the CSI-RS is allocated (1210).

If the PTRS collides with another RS as shown in FIGS. 11 and 12, the operation of the PTRS may be classified as follows.

The PTRS moves to an adjacent subcarrier location/adjacent symbol to be allocated.

Since the PTRS is an important training signal for estimating phase tracking, it may move to the adjacent subcarrier location, such as 1115 of FIG. 11 or 1215 of FIG. 12, so as to prevent the collision with another RS from occurring. In case of moving the subcarrier location as described above, the base station and the terminal may share in advance information on what location the PTRS is to be moved to.

Further, as the PTRS is transmitted in a region in which data is to be transmitted, the base station and the terminal may perform rate matching for data transmission/reception.

As described above, the PTRS shifting information may be shared in advance, and such signaling may be transferred to the terminal through DCI/MAC CE/RRC.

Figure 13:
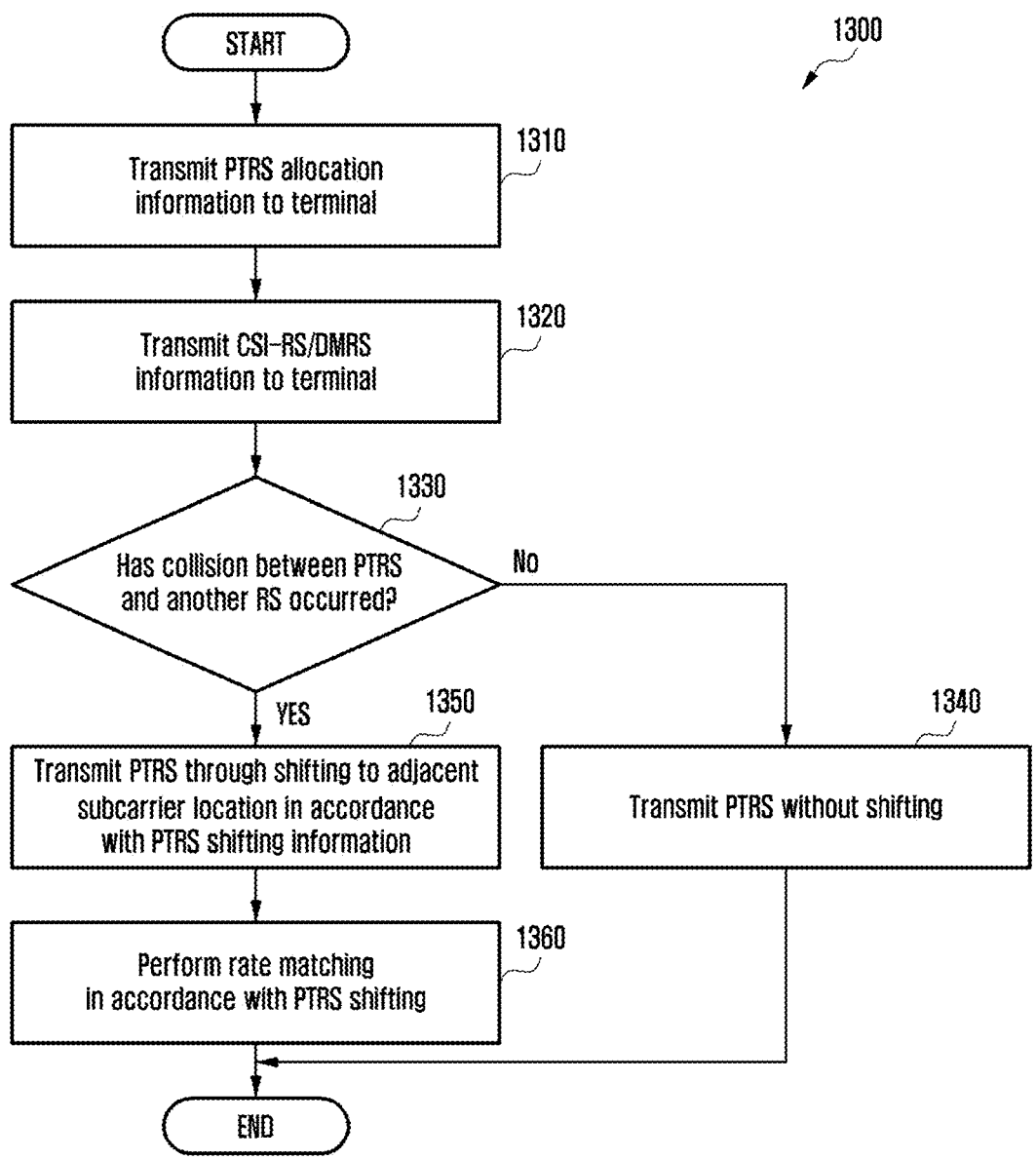
FIG. 13 illustrates an operation of a base station in consideration of a method for allocating PTRS to an adjacent subcarrier through shifting when collision occurs between the PTRS and another RS.
Figure 14:
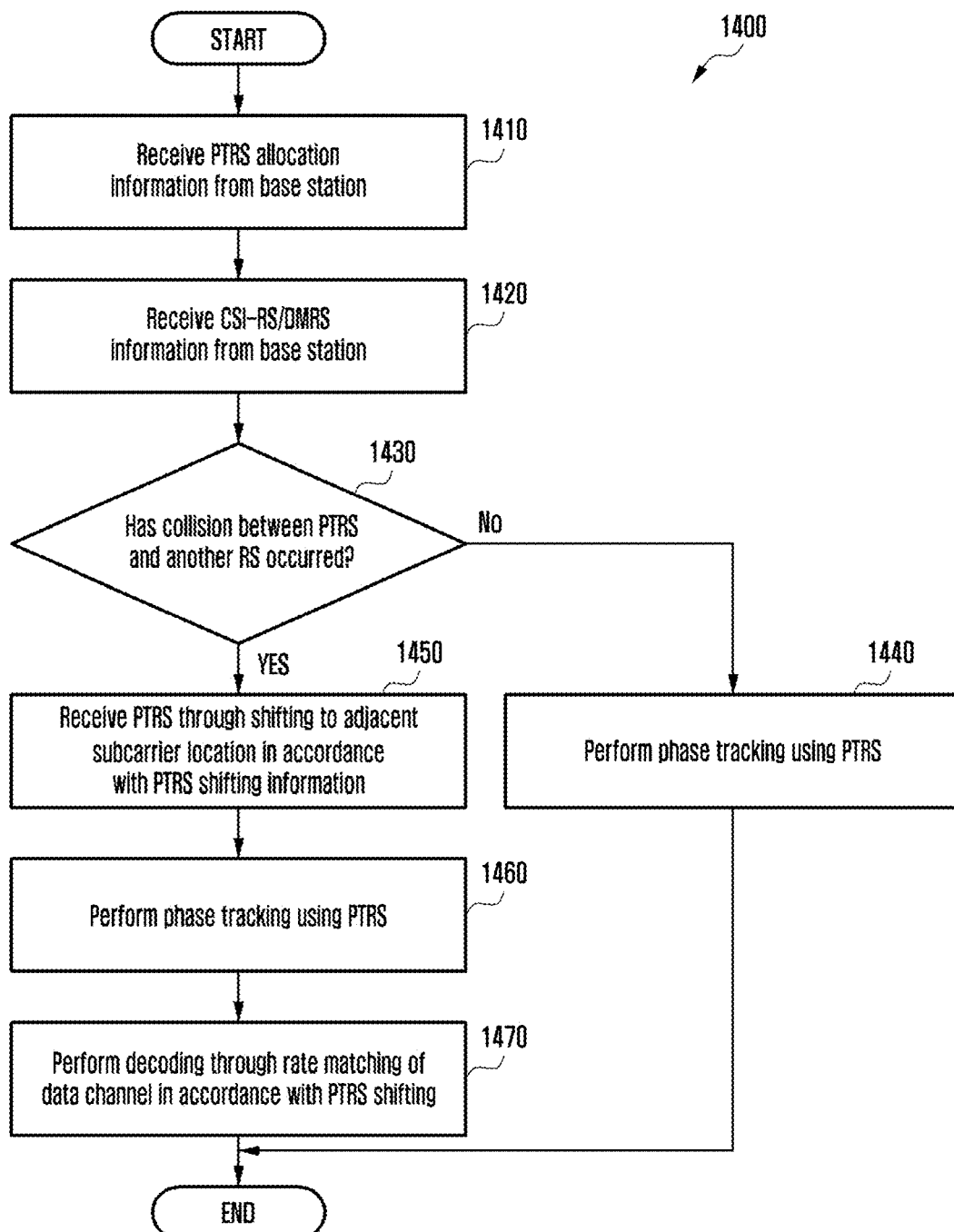
FIG. 14 illustrates an operation of a terminal in consideration of a method for allocating PTRS to an adjacent subcarrier through shifting when collision occurs between the PTRS and another RS.

FIGS. 13 and 14 illustrate operations of a base station and a terminal in accordance with a method for allocating PTRS to an adjacent subcarrier through shifting of the PTRS when collision occurs between the PTRS and another RS. FIG. 13 illustrates the operation of the base station, and FIG. 14 illustrates the operation of the terminal.

First, the base station of FIG. 13 transmits information related to PTRS allocation to the terminal (1310), and also transmits information related to CSI-RS/DMRS allocation (1320). The base station identifies whether collision has occurred between the PTRS and another RS (1330), and if no collision has occurred, the base station transmits the PTRS without the PTRS shifting as described above (1340). In contrast, if collision with another RS has occurred, the base station shifts the PTRS to the adjacent subcarrier location in accordance with the PTRS shifting information to transmit the PTRS (1350). Then, the base station performs rate matching in accordance with the PTRS shifting (1360).

Then, the terminal of FIG. 14 receives the information related to the PTRS allocation from the base station (1410), and also receives the information related to the CSI-RS/DMRS allocation (1420). If it is identified that the collision between the PTRS and another RS has not occurred, the terminal performs phase tracking using the PTRS (1430 and 1440). In contrast, if it is identified that the collision between the PTRS and another RS has occurred (1430), the terminal receives the PTRS shifted to the adjacent subcarrier location in accordance with the PTRS shifting information (1450), and performs the phase tracking using the PTRS (1460). Further, the terminal decodes the data by performing the rate matching on the data channel in accordance with the PTRS shifting (1470).

Figure 15:
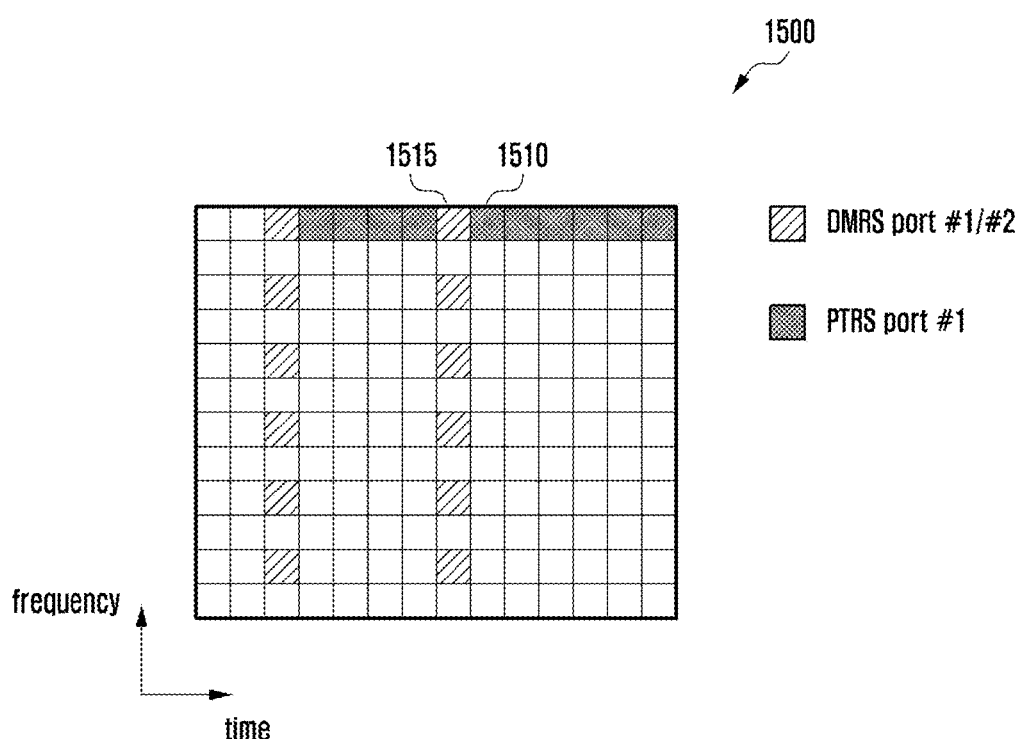
FIGS. 15 and 16 illustrates PTRS puncturing if collision occurs between the PTRS and another RS.
Figure 16:
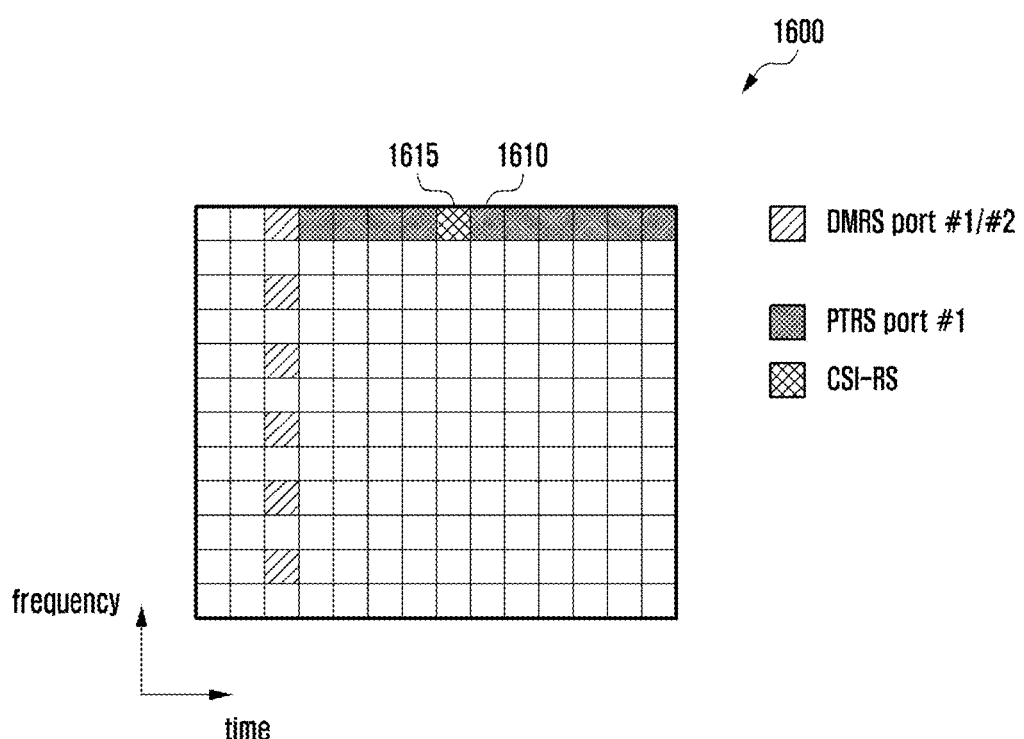

If the collision between the PTRS and another RS has occurred, as another method, the PTRS may be punctured as shown in FIGS. 15 and 16. FIG. 15 illustrates an embodiment in which the PTRS is punctured if the collision between the DMRS and the PTRS has occurred at the subcarrier 1510 to which the PTRS is allocated (1515), and FIG. 16 illustrates an embodiment in which the PTRS is punctured if the collision between the CSI-RS and the PTRS has occurred at the subcarrier 1610 to which the PTRS is allocated (1615).

At the RE location in which collision between the PTRS and another RS occurs, the terminal does not perform the phase tracking, but performs the phase tracking using the adjacent symbol.

Figure 17:
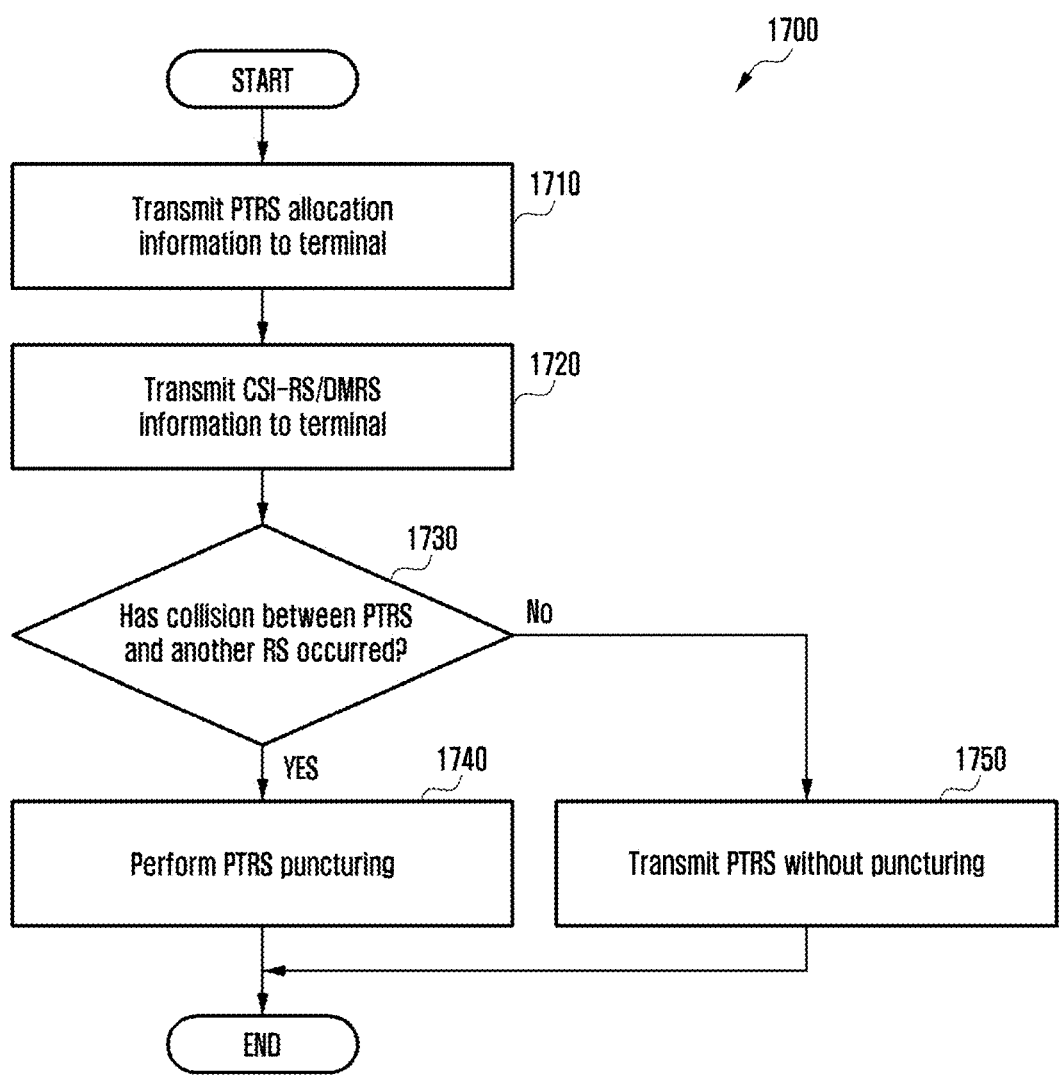
FIG. 17 illustrates an operation of a base station to perform PTRS puncturing if collision occurs between the PTRS and another RS.
Figure 18:
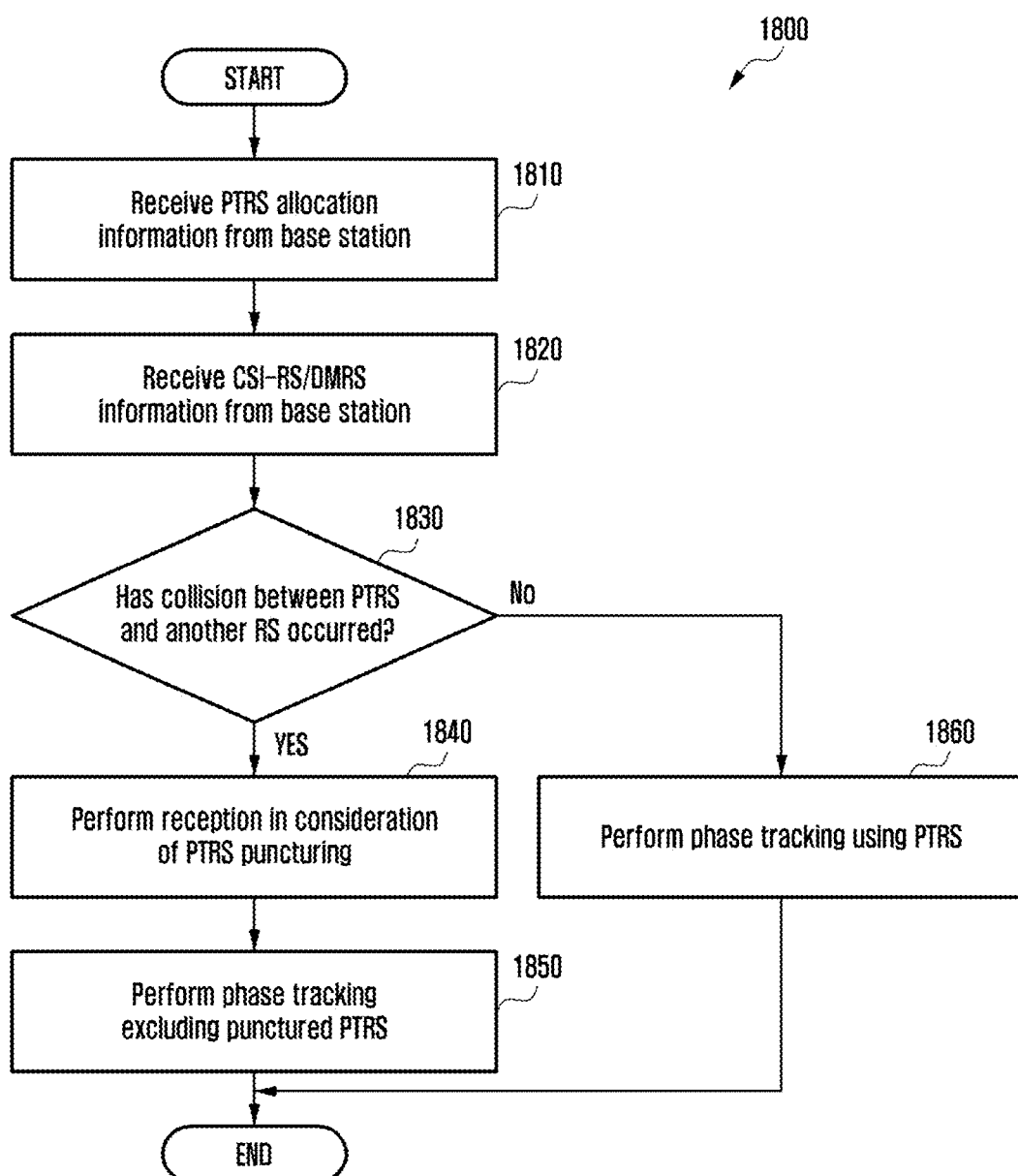
FIG. 18 illustrates an operation of a terminal to perform PTRS puncturing if collision occurs between the PTRS and another RS.

FIGS. 17 and 18 illustrate operations of a base station and a terminal for puncturing a PTRS when collision occurs between the PTRS and another First, the base station of FIG. 17 transmits information related to PTRS allocation to the terminal (1710), and also transmits information related to another RS, such as CSI-RS and DMRS (1720). If it is identified that the collision between the PTRS and another RS has occurred, the base station performs puncturing of the PTRS (1730 and 1740), whereas if it is identified that the collision has not occurred, the base station transmits the PTRS without the puncturing (1750).

Then, the terminal of FIG. 18 receives the information related to the PTRS allocation from the base station (1810), and also receives the information related to another RS, such as the CSI-RS and DMRS (1820). If it is identified that the collision between the PTRS and another RS has occurred, the terminal receives the PTRS in consideration of the PTRS puncturing (1830 and 1840), and performs phase tracking excluding the punctured PTRS (1850). In contrast, if it is identified that the collision between the PTRS and another RS has not occurred, the terminal performs the phase tracking using the PTRS without puncturing (1860).

Figure 19:
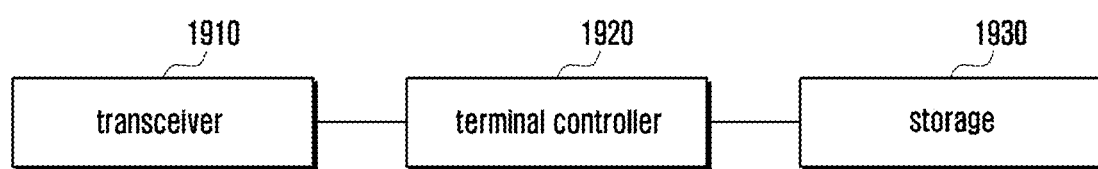
FIG. 19 illustrates the structure of a terminal according to an embodiment of the present disclosure.

FIG. 19 illustrates the structure of a terminal according to an embodiment of the present disclosure.

Referring to FIG. 19, a terminal may include a transceiver 1910, a terminal controller 1930, and a storage 1950. In the present disclosure, the terminal controller 1930 may be defined as a circuit or application-specific integrated circuit or at least one processor.

The transceiver 1910 may transmit/receive signals to/from another network entity. The transceiver 1910 may receive, for example, system information from a base station, and may receive a synchronization signal or a reference signal.

The terminal controller 1930 may control the overall operation of the terminal according to an embodiment of the present disclosure. For example, the terminal controller 1930 may control a signal flow between respective blocks to perform operations according to the drawings and flowcharts as described above. Specifically, the terminal controller 1930 may operate in accordance with the control signal from the base station, and may control the transceiver to send/receive a message or a signal to/from the terminal and/or the base station.

The storage 1950 may store at least one of information transmitted/received through the transceiver 1910 and information generated through the terminal controller 1930.

Figure 20:
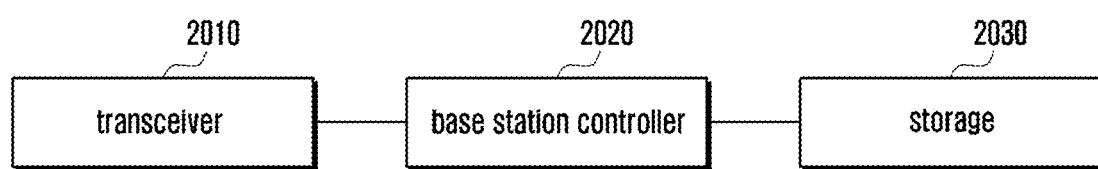
FIG. 20 illustrates the structure of a base station according to an embodiment of the present disclosure.

FIG. 20 illustrates the structure of a base station according to an embodiment of the present disclosure.

Referring to FIG. 20, a base station may include a transceiver 2010, a base station controller 2030, and a storage 2050. In the present disclosure, the base station controller 2030 may be defined as a circuit or application-specific integrated circuit or at least one processor.

The transceiver 2010 may transmit/receive signals to/from another network entity. The transceiver 2010 may transmit, for example, system information to the terminal, and may transmit a synchronization signal or a reference signal.

The base station controller 2030 may control the overall operation of the base station according to an embodiment of the present disclosure. For example, the base station controller 2030 may control operations provided in the present disclosure, such as communication with an adjacent base station and allocation of PTRS to a resource for the terminal.

The storage 2050 may store at least one of information transmitted/received through the transceiver 2010 and information generated through the base station controller 2030.

Although embodiments of the present disclosure have been described in the specification and drawings, these are merely used as general meanings to assist those of ordinary skill in the art to gain a comprehensive understanding of the present disclosure, and do not limit the scope of the present disclosure. Accordingly, it should be analyzed that the scope of the present disclosure includes all changes and modifications derived based on the technical idea of the present disclosure in addition to the embodiments disclosed herein.

Although the present disclosure has been described with various embodiments, various changes and modifications may be suggested to one skilled in the art. It is intended that the present disclosure encompass such changes and modifications as fall within the scope of the appended claims.

What is claimed is:

1. A method performed by a terminal in a wireless communication system, the method comprising:
   identifying a plurality of resource elements (REs) for a phase tracking reference signal (PTRS);
   receiving, from a base station, the PTRS on at least one RE among the plurality of REs; and
   performing a phase tracking using the PTRS received on the at least one RE,
   wherein an RE on which another reference signal is received among the plurality of REs is not used for the receiving of the PTRS,
   wherein the phase tracking is performed without the RE on which the other reference signal is received, and
   wherein a phase tracking of at least one adjacent RE is used for a phase tracking of the RE on which the other reference signal is received.

2. The method of claim 1, wherein a PTRS corresponding to the RE on which the other reference signal is received is punctured.

3. The method of claim 1, wherein the PTRS is allocated to at least one orthogonal frequency division multiplexing (OFDM) symbol that is contiguous on a time-axis.

4. The method of claim 1, wherein the other reference signal comprises a demodulation reference signal (DMRS) or a channel state information reference signal (CSI-RS).

5. A terminal in a wireless communication system, the terminal comprising:
   a transceiver configured to transmit and receive a signal; and
   a controller coupled with the transceiver and configured to:
     identify a plurality of resource elements (REs) for a phase tracking reference signal (PTRS),
     receive, from a base station, the PTRS on at least one RE among the plurality of REs, and
     perform a phase tracking using the PTRS received on the at least one RE,
   wherein an RE on which another reference signal is received among the plurality of REs is not used for the receiving of the PTRS,
   wherein the phase tracking is performed without the RE on which the other reference signal is received, and
   wherein a phase tracking of at least one adjacent RE is used for a phase tracking of the RE on which the other reference signal is received.

6. The terminal of claim 5, wherein a PTRS corresponding to the RE on which the other reference signal is received is punctured.

7. The terminal of claim 5, wherein the PTRS is allocated to at least one orthogonal frequency division multiplexing (OFDM) symbol that is contiguous on a time-axis.

8. The terminal of claim 5, wherein the other reference signal comprises a demodulation reference signal (DMRS) or a channel state information reference signal (CSI-RS).

9. A method performed by a base station in a wireless communication system, the method comprising:
    identifying a plurality of resource elements (REs) for a phase tracking reference signal (PTRS); and
    transmitting, to a terminal, the PTRS on at least one RE among the plurality of REs, wherein the PTRS transmitted on the at least one RE is used to perform a phase tracking,
    wherein an RE on which another reference signal is transmitted among the plurality of REs is not used for the transmitting of the PTRS,
    wherein the phase tracking is performed, by the terminal, without the RE on which the other reference signal is transmitted, and
    wherein a phase tracking of at least one adjacent RE is used for a phase tracking of the RE on which the other reference signal is transmitted.

10. The method of claim 9, wherein a PTRS corresponding to the RE on which the other reference signal is transmitted is punctured.

11. The method of claim 9, wherein the PTRS is allocated to at least one orthogonal frequency division multiplexing (OFDM) symbol that is contiguous on a time-axis.

12. The method of claim 9, wherein the other reference signal comprises a demodulation reference signal (DMRS) or a channel state information reference signal (CSI-RS).

13. A base station in a wireless communication system, the base station comprising:
    a transceiver configured to transmit and receive a signal; and
    a controller coupled with the transceiver and configured to:
        identify a plurality of resource elements (REs) for a phase tracking reference signal (PTRS), and
        transmit, to a terminal, the PTRS on at least one RE among the plurality of REs,
    wherein the PTRS transmitted on the at least one RE is used to perform a phase tracking,
    wherein an RE on which another reference signal is transmitted among the plurality of REs is not used for the transmitting of the PTRS,
    wherein the phase tracking is performed, by the terminal, without the RE on which the other reference signal is transmitted, and
    wherein a phase tracking of at least one adjacent RE is used for a phase tracking of the RE on which the other reference signal is transmitted.

14. The base station of claim 13, wherein a PTRS corresponding to the RE on which the other reference signal is transmitted is punctured.

15. The base station of claim 13, wherein the PTRS is allocated to at least one orthogonal frequency division multiplexing (OFDM) symbol that is contiguous on a time-axis.

16. The base station of claim 13, wherein the other reference signal comprises a demodulation reference signal (DMRS) or a channel state information reference signal (CSI-RS).

* * * * *